Patented June 8, 1943

2,321,490

UNITED STATES PATENT OFFICE 2,321,490

HYDROLYSIS OF TITANIUM SOLUTIONS

John Lewis Keats and Henry Moroni Stark, Wilmington, Del., assignors to E. I. du Pont de Nemours & Company, Wilmington, Del., a corporation of Delaware No Drawing. Application December 27, 1939, Serial No. 311,104

8 Claims. (Cl. 23—202)

This invention relates to the production of titanium oxide compounds adapted for ultimate use as pigment substances, and more particularly to improvements in hydrolyses procedures commonly used in producing such pigments. More specifically, it relates to a novel method for accelerating the hydrolysis of titanium salt solutions, and especially solutions of titanium sulfate.

A number of methods for accelerating the hydrolysis of titanium salt solutions embodying the use of various types of seeding or nucleating agents have been already proposed. One such prior process effects nucleation by employing relatively large amounts (40% on the pigment basis) of raw, untreated $TiO_2$, from a previous hydrolysis. Aside from being uneconomical and commercially prohibitive because use of such large quantities of raw pigment precipitate is required, no marked or significantly beneficial results arise from a practice of this type of process. Another seeds a titanium sulfate solution by employing peptized, previously precipitated raw $TiO_2$ in hydrochloric or nitric acid. As a necessary adjunct to its operability, desulfation and removal of $H_2SO_4$ present in the raw precipitate is essential before one can obtain desired peptization. This purification is effected by either washing the $TiO_2$ precipitate or neutralizing the same with a basic substance, and, in the latter event, finally washing to remove soluble salts introduced by reason of the neutralization treatment. Obviously, these procedures incur inconvenient, time and cost-consuming washing or neutralization operations before procurance of the desired peptized seed material.

We have found that a highly efficient, peptized seeding agent useful in titanium hydrolysis may be obtained from raw, precipitated titanium oxide without resorting to the disadvantageous time and cost-consuming purification operations considered necessary heretofore.

It is among the objects of our invention, therefore, to provide a novel process for attaining these and other advantageous results. A particular object is to provide a novel process for accelerating the hydrolysis of titanium sulfate solutions and by use of a novel type of nuclei seed prepared from raw pigment titanium oxide precipitate produced in a previous hydrolysis. Other objects and advantages will be apparent from the ensuing description of our invention.

These objects are accomplished in this invention which comprises dispersing raw $TiO_2$ pigment particles arising from the hydrolysis of a titanium salt solution by treating such precipitate with sulfuric acid, and thence employing the resulting seeding material to accelerate hydrolysis of a titanium liquor.

In a more specific and preferred embodiment, the invention comprises subjecting a precipitated, raw titanium hydrolysate to heat treatment in the presence of an amount of relatively concentrated sulfuric acid insufficient to effect complete dissolution of said precipitate, and then employing the resulting activated seed material as a nucleating agent to accelerate hydrolysis of a titanium sulfate solution.

In conducting the invention in accordance with one preferred adaptation, a raw anatase or rutile hydrolysate is slurried with relatively concentrated sulfuric acid sufficient in amount to effect partial dissolution of the raw titanium oxide pigment, but insufficient to completely solubilize the same. For such purpose, a quantity of acid ranging from substantially 1 mol to 2.5 mols $H_2SO_4$ per mol of $TiO_2$ may be used. Preferably, and to obtain optimum benefits hereunder, an amount of $H_2SO_4$ ranging from about 1.3 or 1.5 to about 2.0 mols of $H_2SO_4$ per mol of $TiO_2$ is used. The concentration of the acid, after dilution with any water present in the raw pigment, that is, the concentration of the attack acid in contact with the pigment prior to subsequent heating, should be in the range of from about 30% to 85% and, preferably, from about 40% to about 70% $H_2SO_4$. After mixing or slurrying the raw titanium oxide pigment with the requisite quantity and concentration of acid, the resulting mixture is heated, for a relatively short period of time, preferably to a temperature above about 100° C., and to near the boiling point of the solution, being held in this temperature range until the appearance of the opaque slurry becomes substantially translucent. As a result of such treatment, a seed suspension is obtained which may be directly employed as a nucleating agent for accelerating the hydrolysis of titanium liquors, especially titanium sulfate. The amount of activated seed material required for such seeding will be found to be relatively small, and in general may range from about .1% to 20% on the pigment basis, a preferred, working range being from about 1% to 5% or 10%, on the pigment basis. After adding or otherwise incorporating the seed suspension in the titanium liquor, the resulting nucleated solution is then heated to boiling in accordance with usual and normal hydrolysis procedures, such heating being continued until substantially complete precipitation is effected.

To a more complete understanding of the invention, the following examples are given in illustration, none of which, however, are to be considered as limiting the scope of our invention:

*Example I*

Anatase raw pigment containing 33% $TiO_2$ on the weight basis and equivalent to 40 parts $TiO_2$ was slurried with 90 parts of concentrated $H_2SO_4$ equivalent to 1.75 mols $H_2SO_4$ per mol $TiO_2$, which gave an acid solution containing about 53% $H_2SO_4$ in contact with the $TiO_2$. The slurry was heated at 120° C. to 130° C. until it became translucent in appearance. This translucent dispersion was then added to a solution of titanium sulfate and the concentration adjusted to 183 grams $TiO_2$ per liter. The amount of seed added was equal to 10% on the pigment basis. The solution was boiled for three hours. The yield was 98.0% compared with a yield of about 30–40% for a solution without seed and boiled for the same length of time. The yield was 40% when titanium sulfate was seeded with 10% of anatase raw pigment which had not been conditioned by partially dissolving in $H_2SO_4$.

*Example II*

Seed nuclei were prepared as in Example I by partially dissolving anatase raw pigment in 53% $H_2SO_4$ containing 1.75 mols $H_2SO_4$ per mol $TiO_2$. This seed suspension was added to titanium sulfate solution in an amount equivalent to 0.3% on the pigment basis. The yield after boiling the seeded solution for three hours was 72.0%.

*Example III*

Seed nuclei were prepared by partially dissolving rutile raw pigment prepared by the hydrolysis of $TiCl_4$ solution. The acid solution used in attacking the raw pigment contained 57% $H_2SO_4$ and seed suspension to the amount of 5% on the $TiO_2$ basis was added to the titanium sulfate solution. The yield after 3 hours boiling was 57%.

Although specific hydrolysate or raw pigment titanium dioxide precipitates have been used hereinabove as starting materials in the preparation of our novel type of seeding agent, it will be understood that by the term "hydrolysate" we have reference to precipitates resulting from the hydrolysis of titanium salt solutions, e. g., the sulfate, chloride, etc., examples of well-known processes for their production including those set out in U. S. Reissue Patents 18,854, 18,790 or in U. S. Patent 2,062,133.

Also, though particular temperatures have been specified hereinabove for effecting desired conditioning of the seed material after treatment with sulfuric acid, these temperatures are not to be considered as critical to the invention. Thus, temperatures to as low as about 80° C. to 90° C., provided the time of heating is sufficiently prolonged, may be used, as may temperatures up to the order of, say, 200° C. Preferably, however, temperatures which substantially approach the boiling point of the attack acid are most advantageously employed.

Again, while the novel seeding agent of our invention is notably useful for accelerating the hydrolysis of titanium sulfate solutions, the same may be used, if desired, as a seeding agent in the hydrolysis of other types of titanium solutions, such as the nitrate, chloride, oxalate, fluoride, etc.

In the above examples, wet anatase raw pigment has been used and to this concentrated sulfuric acid has been added, the amount and concentration of the added acid being preferably adjusted with due regard to the composition of the wet raw pigment. As commonly produced, wet raw pigment may contain from about 30% to 35% $TiO_2$, but it is to be understood that any other grade or character of raw pigment may be used in the invention, since it is only necessary that in preparing the reaction mixture the amounts and concentration of the added sulfuric acid be suitably adjusted to produce a mixture in which the ratio of $H_2SO_4$ to $TiO_2$ and the ratio of $H_2SO_4$ to $H_2O$ are within the specified ranges. Thus, the invention may be illustrated by one rather extreme modification in which seed-containing nuclei of very desirable properties is prepared by mixing previously dried and pulverized raw pigment with sulfuric acid of 85% to 95% concentration to give a paste containing about 65% $H_2SO_4$ by weight. This paste is heated at about 180–200° C. until partial attack occurs and the opaque, white mass becomes brown in appearance. The mass is then disintegrated by mixing with hydrolysis solution or with cold water to give a colloidal solution which is quite effective in accelerating hydrolysis when heated under hydrolysis conditions.

As will be evident, the benefits obtainable in this invention are accomplished by using colloidal seed nuclei prepared by dispersing raw titanium oxide pigment particles by means of sulfuric acid itself. The invention thus advantageously eliminates the undesired desulfation of the acid cake which has been required when previous types of hydrolysis seeding agents have been prepared. Furthermore, hydrolysis is readily effected by the use of as little as 1% or even less of the resulting seed material, whereas in prior procedures, where no seed conditioning is effected, about 40% is specified. Again, the seed material used in our process is readily available, being obtained from a normal hydrolysis product, and the sulfuric acid which is employed is used elsewhere in the process in attacking a titaniferous ore such as ilmenite. Thus, no additional chemicals are required in effecting preparation of our seeding agent.

We claim as our invention:

1. A process for producing a nucleating agent useful for accelerating the hydrolysis of a titanium salt solution, comprising subjecting a titanium oxide precipitate obtained from the hydrolysis of a titanium salt solution to treatment with an amount of sulfuric acid sufficient to partially dissolve said precipitate but insufficient to completely solubilize the same, and maintaining the resulting opaque suspension at an elevated temperature until the same becomes substantially translucent to develop its nucleating characteristics.

2. A process for producing a nucleating agent useful in titanium liquor hydrolysis, comprising mixing raw precipitated pigment $TiO_2$ obtained from the hydrolysis of a titanium salt solution with sulfuric acid, and then conditioning the resulting opaque mixture by heating at an elevated temperature until the same becomes substantially translucent, the ratio of $H_2SO_4$ to $TiO_2$ in said mixture being in excess of molecular proportion but short of an amount of acid sufficient to completely solubilize said $TiO_2$.

3. A process for producing a nucleating agent useful for accelerating the hydrolysis of titanium salt solutions comprising mixing precipitated raw $TiO_2$ obtained from the hydrolysis of a titanium salt solution in an excess quantity of sulfuric acid, insufficient to effect complete dissolution of said $TiO_2$, and thence subjecting the resultant opaque mixture to heat treatment at temperatures ranging from about 80° C. to the boiling point of said mixture and until the same becomes substantially translucent.

4. A process for producing a nucleating agent useful for accelerating the hydrolysis of titanium liquors comprising mixing precipitated raw pigment titanium oxide from a previous hydrolysis of a titanium salt solution with an amount of relatively concentrated sulfuric acid, ranging from about 1 mol to 2.5 mols to each mol of $TiO_2$, and heating the resulting opaque mixture below its boiling point until said mixture becomes substantially translucent.

5. A process for producing a nucleating agent useful for accelerating the hydrolysis of titanium sulfate solutions comprising mixing precipitated titanium oxide obtained from the hydrolysis of a titanium salt solution with sulfuric acid to obtain a mixture containing acid of 30% to 85% concentration and a ratio of 1.3 to 2.0 mols $H_2SO_4$ to each mol of $TiO_2$, and thereafter subjecting the resulting opaque mixture to heat treatment at temperatures ranging from 90° C. to the boiling point of the acid solution until said mixture becomes substantially translucent.

6. A process for producing a nucleating agent adapted to accelerate the hydrolysis of a titanium sulfate solution, comprising mixing precipitated titanium oxide obtained from the hydrolysis of a titanium salt solution with an amount of sulfuric acid sufficient to only partially solubilize said oxide, and then maintaining the resulting opaque mixture at a temperature above about 100° C. and under its boiling point until said mixture is rendered substantially translucent in appearance.

7. A process for producing a nucleating agent adapted to accelerate the hydrolysis of a titanium sulfate solution, comprising mixing raw anatase precipitate obtained from the hydrolysis of a titanium sulfate solution with an excess quantity of relatively concentrated sulfuric acid but insufficient to completely solubilize said anatase, and thereupon maintaining the resulting opaque mixture at a temperature above about 100° C. and under its boiling point until said mixture presents a substantially translucent appearance.

8. A process for hydrolyzing titanium sulfate solutions comprising mixing a hydrolyzed, $TiO_2$ precipitate obtained from the hydrolysis of a titanium sulfate solution with a quantity of sulfuric acid such that the resultant mixture contains at least one part of $H_2SO_4$ per two parts of $H_2O$, and said amount of acid is in excess of the molecular proportion of the $TiO_2$ but insufficient to completely solubilize said $TiO_2$, thereafter heat treating the resultant opaque mixture at temperatures ranging from substantially 80° C. to the boiling point of the solution and until said mixture becomes substantially translucent, and then employing from 0.1 to 20%, on the pigment basis, of the resulting translucent material as a seeding agent in the hydrolysis of said titanium sulfate solution

JOHN LEWIS KEATS.
HENRY MORONI STARK.